United States Patent [19]
Goldberg et al.

[11] 3,919,938
[45] Nov. 18, 1975

[54] PERMANENT ELECTROSTATIC MASTER

[75] Inventors: Eugene P. Goldberg, Rochester; Donald A. Seanor, Pittsford, both of N.Y.

[73] Assignee: Xerox Corporation, Stamford, Conn.

[22] Filed: Sept. 20, 1974

[21] Appl. No.: 507,710

[52] U.S. Cl. .............................. 101/401.1; 101/426
[51] Int. Cl.[2] ......................................... B41M 1/42
[58] Field of Search............. 101/401.1, 401.2, 426; 283/6

[56] References Cited
UNITED STATES PATENTS

| | | | |
|---|---|---|---|
| 2,793,135 | 5/1957 | Sims .......................... | 101/401.1 UX |
| 2,972,304 | 2/1961 | Jarvis ................................. | 101/426 |
| 3,468,254 | 9/1969 | Ritzerfeld ....................... | 101/401.1 |
| 3,575,109 | 4/1971 | Wall................................ | 101/401.1 |
| 3,677,750 | 7/1972 | Mammino..................... | 101/401.1 X |

OTHER PUBLICATIONS

Kazan et al., "A New Method of Thermoplastic Image Recording Based on Orientation of Colloidal Particles", Photographic Science and Engineering, pp. 274-282, Vol. 12, No. 6 (1968).

*Primary Examiner*—Harland S. Skogquist
*Attorney, Agent, or Firm*—James J. Ralebate; James P. O'Sullivan; David A. Blumenthal

[57] ABSTRACT

A method of producing multiple copies from a permanent master containing a latent image produced by aligning anisotropic particles in the presence of an image electrostatic field. The permanent master so formed may be utilized to produce multiple copies of the original document by merely charging the master without the necessity of repeated exposure steps.

12 Claims, 8 Drawing Figures

PERMANENT ELECTROSTATIC MASTER

BACKGROUND OF THE INVENTION

1. Field of the Invention

The invention pertains to the formation and utilization of a permanent master to produce multiple copies of an original document.

2. Description of Prior Art

The recording of half-tone images using a thermoplastic film by aligning opaque colloidal particles within the film interior is known in the art as illustrated by Kazan et al. "A New Method of Thermoplastic Image Recording Based on Orientation of Colloidal Particles", *Photographic Science and Engineering*, Vol. 12, No. 6 (1968). As discussed in the Kazan article, the optical properties of the collodial particles may be utilized to produce a permanent record within the film which may be read out by means of known reflection and transmission systems. The permanent optical record is produced by forming a charge image at the surface of the termoplastic film and subsequently heating and softening the film in the presence of the charge image to align and orient dispersed graphite particles. The film is subsequently cooled to "freeze in" the charge image such that the oriented particles present a reflected or transmitted image corresponding to the original charge image. The Kazan article discusses measurements of small changes in electrical resistivity of the film in a charge region. However, the utilization of "frozen-in" electrical resisitivity regions or regions of different dielectric constant to produce a permanent master for reproducing the original (or reverse) charge image has not developed.

SUMMARY OF THE INVENTION

It is an object of the invention to produce an alignment of anisotropic particles in a master to permanently record an image for subsequent xerographic printing.

Another object of the invention is to eliminate the necessity for retaining original copies in xerographic reproduction processes.

Another object of the invention is to provide a method of producing multiple copies of a document without the necessity for retaining the original document nor exposure of the original document to develop a charge image.

Another object of the invention is to produce a permanent master for xerographic development wherein the master contains image regions having varying electrical resistivity and/or dielectric constant.

Yet another object of the invention is to provide a permanent master which may be uniformly sprayed with a corona charge to produce the charge image by selective discharge through the master without the necessity for exposure to the original document or a charge image thereof.

The invention contemplates alignment of anisotropic particles within a polymeric matrix such that on application of a charged electrical field, the anisotropic particle will align after softening of the materials and retain their aligned state when the matrix is hardened upon cooling. The resulting alignment and/or migration of particles makes it possible to subsequently charge the matrix as, for example, with a uniform corona charge so that different image areas of resistivity and/or dielectric constant within the matrix will effectuate a selective discharge through a matrix to automatically produce the desired charge image on the matrix surface. The charge image so produced may subsequently be developed upon the application of toner particles in accordance with standard xerographic processes.

BRIEF DESCRIPTION OF THE DRAWINGS

These and other objects of the invention will become more apparent and the invention itself will be best understood by reference to the following description of the invention taken in conjunction with the accompanying drawings, wherein.

DETAILED DESCRIPTION OF THE PREFERRED EMBODIMENT

As shown in FIG. 1, the method comprises a first series of steps conducted to prepare the permanent master in accordance with the desired charge image. The charge pattern may be produced by several conventional methods as by electron beam scanning, current flow through a photoconductive layer or current flow through the polymeric matrix itself which acts as a photoconductor.

Figure 1A:
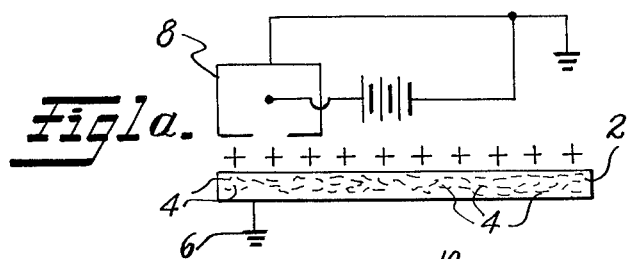
FIGS. 1a, 1b, 1b' and 1c are sectional diagrams illustrating steps in the invention in preparation of the permanent master.
Figure 1B:
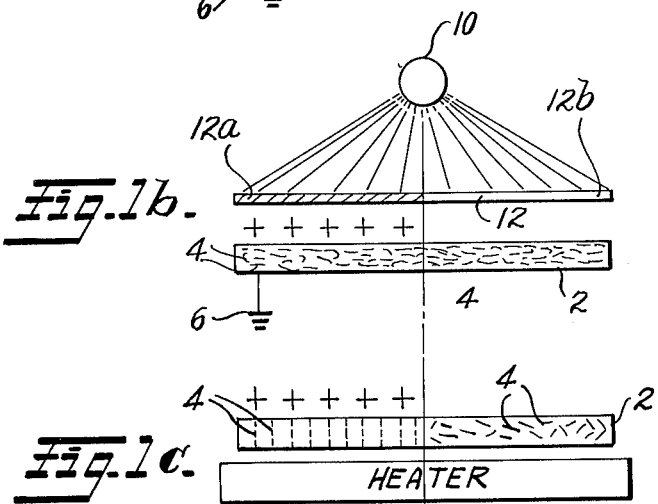
Figure 1B:
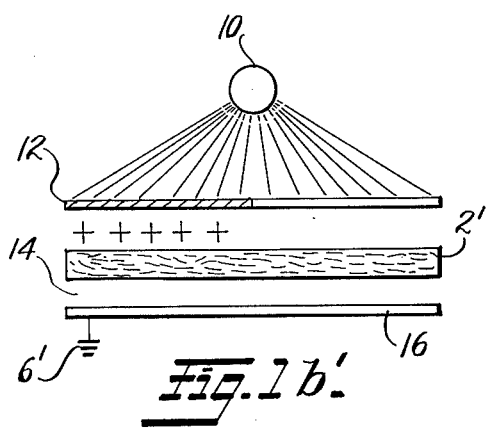

FIG. 1a illustrates a method of charging a master or matrix utilizing charge sprayed from a conventional corona source. The polymeric matrix 2 has embedded therein anisotropic particles 4 which are randomly oriented as shown in the Figure. The particles may be anisotropic in shape, electrical conductivity, electrical polarizability or dipole moment. In the embodiment shown, the matrix 2 has a high dielectric constant and is photoconductive. One side of the matrix is grounded at terminal 6. A corona charge source 8 is moved across the surface of the matrix to deposit a charge uniformly thereon. After the charging process, the matrix is exposed to an image for selectively discharging areas through the photoconductive matrix. FIG. 1b shows the image exposure process wherein a light source 10 is positioned to direct light through a transparent image medium 12 onto the matrix 2. The transparent image medium is composed of light absorbing and light transmitting regions labeled 12a and 12b, respectively. The light transmitting region 12b passes light to the matrix 2 which effectuates a discharge through the photoconductive matrix to dissipate charge on the surface thereof. The light absorbing region 12a does not pass sufficient light to the photoconductive matrix to render the corresponding areas conductive and thus the corona charge remains on the surface of the matrix 2, in the region associated with the light absorbing area 12a of the transparent image medium 12. The process shown in FIG. 1b thus may be utilized to selectively discharge the matrix 2 to produce a charge image on the surface thereof.

Various other methods of image charging the matrix may be utilized and are well known in the art. As shown in FIG. 1b', for example, a non-photoconductive matrix 2' may be employed together with a separate layer of photoconductive material 14. The photoconductive layer 14 is provided with a conductive backing 16 which is grounded at 6'. alternately, the photoconductive layer 14 may be embedded in the matrix 2'.

It is also evident that the image medium 12 may be opaque and the selective discharge established in accordance with the image reflected from the surface of the medium.

Figure 1C:
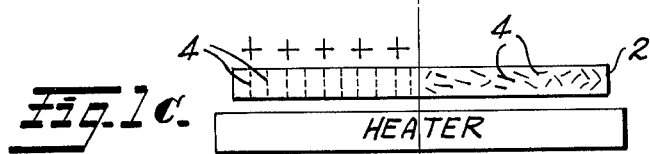

After the charge image has been produced on the matrix surface, it is necessary to soften the polymeric matrix to permit the anisotropic particles to align and/or migrate in accordance with the field established therein by the charge image pattern on the surface of the matrix. Consequently, as shown in FIG. 1c, the polymeric matrix is heatd to lower its viscosity and permit alignment.

Figure 1D:
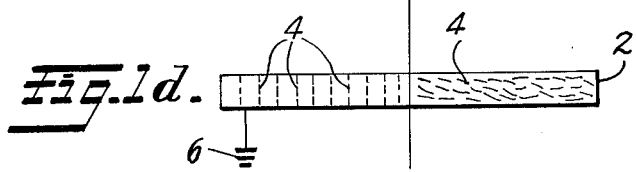

After heating, the matrix is quenched (FIG. 1d), so as to increase the viscosity of the polymeric matrix material and freeze in the anisotropic particles in their aligned state. Grounding of th matrix as shown in FIG. 1d allows the surface charge on the matrix to discharge through the matrix in accordance with the RC time constant established by the anisotropic particle/matrix combination.

Figure 2A:
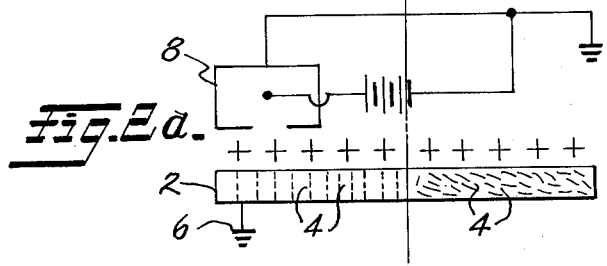
FIGS. 2a–2c are sectional diagrams of additional steps taken in the invention in producing a copy of the original document by utilizing the permanent master.
Figure 2B:
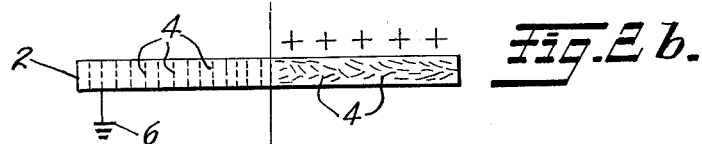
Figure 2C:
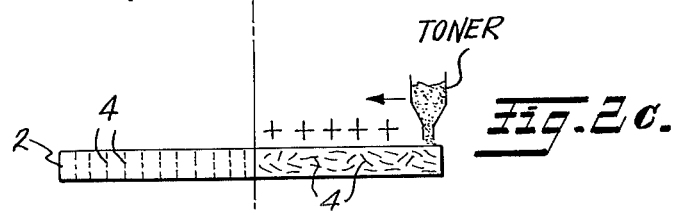

FIGS. 2a–2c disclose the method of utilizing the electrical characteristics of the matrix to produce any desired number of copies of the original document. FIG. 2a shows the first step in the copy reproduction process which is to non-image charge the surface of the matrix. The charge may be sprayed on uniformly, such as by using a corona charge source as was done in the initial production process. The original document is no longer needed and one eliminates any further image charging of the surface through exposure of the original document. One side of the matrix 2 is grounded so that the uniform charge placed on the surface of the matrix may dissipate through the aligned matrix regions to ground as shown in FIG. 2b. The resitivity of the unoriented or unaligned anisotropic particles is much greater than that of the aligned particles and subsequently, a charge pattern is produced on the surface of the matrix corresponding to the light and dark regions of the original image medium 12. For the embodiment illustrated, the charge pattern is the negative or inverse of the original charge pattern as shown in FIG. 1b.

Once the desired charge pattern has been established on the matrix 2, the matrix may be developed as shown in FIG. 2c by the application of toner particles to the matrix surface. The toner development technique is standard in the art and is utilized in many xerographic reproduction processes. The subsequent transfer of the toner image to a receiving medium for producing hard copy is also well-known in the art.

The composition of the master or matrix 2 may be selected from a number of compounds. A photoconductive matrix having a high dielectric constant is antimony sulfur iodine (e.g., *Physical Review* 127, 2036, 1962) although photoconductive materials such as cadium sulphoselenide, cadmium sulphide, cadmium selenide and the various forms of photoconducting phthalocyanine pigments may also be utilized. A wide variety of non-photoconductive thermo plastic materials may also be used as the matrix material or binder such as polyurethanes, vinyl chlorides, polyesters, polysiloxanes, polyethylenes, polyturpene resins and other copolymers with suitable softening behavior. Other materials with appropriate melting points such as waxes, paraffinic hydrocarbons, plasticizers such as diphenyl phthalate, etc. are also suitable as matrix materials. In addition, resins which can be cured at ambient temperature can also be used to freeze in the latent conductive or dielectric image. These would include epoxy resin, room temperature vulcanizing rubbers, etc. The filler of anisotropic particles may comprise barium titanate, copper powder, carbon black or simply fine metal wires which act as diopoles in the polymer medium.

Specifically, Sylgard 184, a silicone rubber compound, was used as a matrix with barium titanate as a filler. The dielectric constant of image areas versus non-image areas was found to vary by a factor of two and electrical conductivity by a factor of 10.

The mathematical description of the master having an RC time constant is summarized below.

The potential on the surface of the matrix $V_1$ decays exponentially as $V_1 = V_0 e^{-t/\tau}$ where $\tau$ is the relaxation time of the matrix given by:

$$\tau = RC = k \left( \frac{EA}{d} \right) \cdot \left( \frac{\rho d}{A} \right) = KE\rho$$

where $A$ is the area of the matrix, $d$ the thickness, $\epsilon$ the dielectric constant, $\rho$ the electrical resistivity and $k$ a constant ($8.85 \times 10^{-14}$). For two different regions, as for example, the matrix-filler regions where the filler particles are aligned and non-aligned, the voltage contrast is given by:

$$V(t) = V_0 (e^{-t/\tau_1} - e^{-t/\tau_2})$$
$$V(t) = V_0 (e^{-t/k\epsilon_1 \rho_1} - e^{-t/k\epsilon_2 \rho_2})$$

where the subscripts 1 and 2 refer to the two regions.

The selection of the RC decay time is tailored to effect any desired contrast for the particular choice of reproduction cycle time and matrix/filler composition. One may vary the dielectric constant or the resistivity to control the RC decay time. Order of magnitude calculations may be made using the simple equation $V_1(t) = V_0 e^{-t/\tau}$ where $\tau = k\epsilon\rho$. For example, assuming a reproduction cycle time such that the desired contrast should be established at the end of one second, and putting $\epsilon = 4$, $\rho = 10^{16}$ ohm-cm, the ratio $V_1(t = 1 \text{ sec})/V_0 \cong 1$. However, setting $\rho = 10^{13}$ ohm-cm gives $V_1(t = 1 \text{ sec})/V_0 = 0.75$, and $\rho = 10^{10}$ ohm-cm gives $V_1(t = 1 \text{ sec})/V_0 = 10^{-125}$. The range of $10^{11} \leq \rho \leq 10^{13}$ yields good contrast control for the one second time frame.

Likewise, changing the dielectric constant $\epsilon$ also effects a contrast change, but the time constant is less sensitive for practical values of $\epsilon$ and most useful values of $\epsilon$ are between 2–10.

Although the invention has been described with reference to the preferred embodiment, it is understood that certain modifications and improvements may be evident to those skilled in the art and the invention is intended to cover all modifications which do not depart from the spirit and scope of the invention.

We claim:

1. A method of storing images in a matrix having electrically anisotropic particles dispersed therein and reproducing said images comprising the steps of:
   charging said matrix to establish image-charge regions on the surface thereof and a corresponding electric field in the interior of said matrix,
   softening said matrix in the presence of said surface image-charge regions thereby reducing the viscosity of the matrix and aligning the anisotropic particles in accordance with said surface image-charge regions,
   cooling said matrix to fix the position of said aligned anisotropic particles whereby the matrix contains electrical image regions corresponding to said surface image-charge regions,
subsequently producing a visual image by the steps of:
charging said matrix,
allowing image-charge regions to form on the surface of said matrix by selective discharge through said electrical image regions in said matrix, and
developing said image-charge regions of said master.

2. A method as recited in claim 1 wherein said second charging step is a non-image charging step.

3. A method as recited in claim 1 wherein said developing step comprises applying toner particles to said master to form toner image regions.

4. A method as recited in claim 1 wherein said matrix is photoconductive.

5. A method as recited in claim 1 wherein said first charging step is an image-charging step.

6. A method of forming regions of different RC decay time constants within a material and forming surface image charge regions corresponding thereto comprising the steps of:
image-charging said material to establish image-charge regions on the surface of said material,
aligning filler particles within said material in accordance with said image charge regions, said aligned filler particles have an RC decay constant smaller than the RC decay constant of non-aligned regions,
subsequently producing a surface image charge on said material by:
non-image charging said material;
allowing the formation of a surface image charge on said material by charge decay through said material whereby surface charge is dissipated at a higher rate by said aligned filler particles than by said non-aligned filler particles.

7. A method as recited in claim 6 wherein said RC decay time constant may be determined by:
selecting the electrical resistivity of said material/filler composition and
selecting the dielectric constant of said material/filler composition.

8. A method as recited in claim 7 wherein said electrical resistivity is selected within the range $10^{11} \leq \rho \leq 10^{13}$, and said dielectric constant is selected within the range $2 \leq \epsilon \leq 10$.

9. A method as recited in claim 6 wherein aligning said filler particles comprises the steps of:
reducing the viscosity of said material to allow filler particle alignment, and
increasing the viscosity of said material to fix said alignment.

10. A method as recited in claim 9 wherein said reducing and increasing said material viscosity comprises respectively heating and cooling said material.

11. A method as recited in claim 6 wherein said material is silicone rubber and said filler is barium titanate.

12. A method as recited in claim 6 wherein said material is photoconductive.

* * * * *